May 30, 1933.  E. BLEIBLER  1,911,878
METHOD OF PRODUCING STRIPS, FILMS, AND THE LIKE
Filed May 12, 1931  2 Sheets-Sheet 1
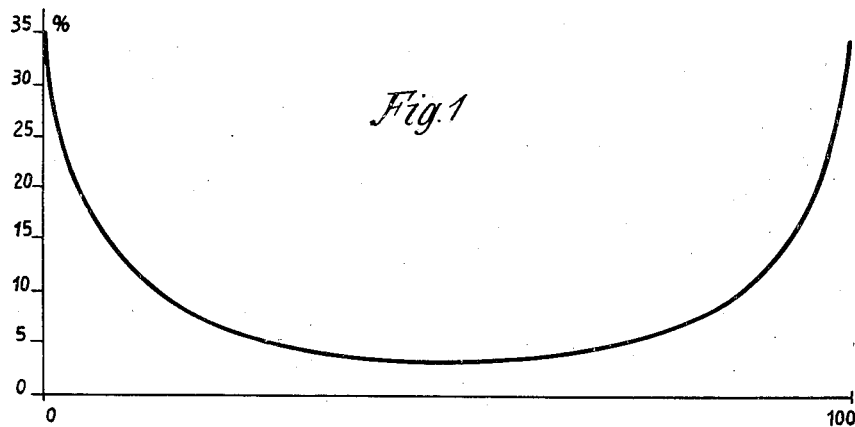
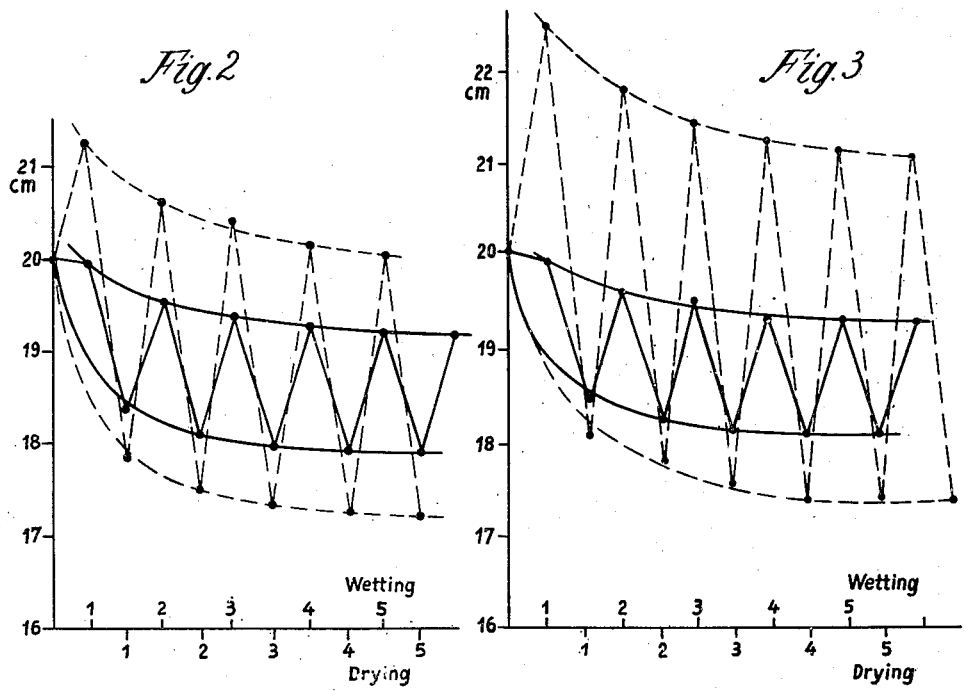

May 30, 1933. E. BLEIBLER 1,911,878

METHOD OF PRODUCING STRIPS, FILMS, AND THE LIKE

Filed May 12, 1931 2 Sheets-Sheet 2

Inventor:
Ernst Bleibler,
By Byrnes Townsend & Potter,
Attorneys.

Patented May 30, 1933

1,911,878

UNITED STATES PATENT OFFICE

ERNST BLEIBLER, OF WINTERTHUR, SWITZERLAND

METHOD OF PRODUCING STRIPS, FILMS, AND THE LIKE

Application filed May 12, 1931, Serial No. 536,922, and in Germany May 21, 1930.

This invention relates to a method of manufacturing cellulose films, more particularly films regenerated from viscose, and which after being finished in the form of strips, tapes, webs, bands and the like, are to be subjected to a wet treatment when utilized. Such films are employed more especially for the manufacture of photographic films, which must be treated in baths, either when coating them with the emulsion or during the subsequent treatment when developing them in the sensitized state. Films of this nature possess the drawback that they shrink or contract unequally on being redried, and the quality of the product is thus adversely affected.

The present invention is based on the surprising fact discovered by the inventor that too great a shrinkage capacity, i. e. a reduction of dimensions between one dry state and the next or between one wet state and the next when alternately wetting and redrying the films is responsible for these drawbacks. They may be avoided if, according to this invention, by an appropriate treatment of the film, the shrinkage capacity is reduced to an amount less than 12%.

Another surprising fact discovered by the inventor is that in a film manufactured continuously under tension, the parts of the film taken in the transverse direction are much more liable to be damaged than those taken in the length direction of its manufacture, owing to the fact that the shrinkage capacity increases from the middle portion of the film towards the marginal portions.

The method of manufacturing cellulose strips and the like, therefore, according to the invention consists in subjecting the material to such a treatment that the shrinkage capacity from one dry state to the next or from one wet state to the next is reduced to an amount less than 12%.

In accordance with one embodiment, the film when produced and finished is continuously held under tension and its marginal portion is removed so as to leave a central zone the transverse shrinkage of which is below 10%, while in another embodiment of the invention the shrinkage capacity is reduced to the desired amount by wetting and drying the strips or films at least three times prior to the subsequent wet treatment, at least two drying operations taking place under tension and at least one intermediate drying operation without the application of tension.

The present invention provides a development of the method by which the quality of the films may be further improved and at the same time embraces arrangements in the apparatus for carrying the method into effect.

According to the present invention the last drying operation of a series will take place while the film is subject to tension but in such a way the shrinkage of the film, more particularly the transverse shrinkage, is permitted. Thus during this drying process the film is kept under tension, in such a manner, however, that it is free to shrink or contract. By this process the smooth drying of the film is ensured, and at the same time the film is secured against the danger that the shrinkage which has been prevented during the drying process takes place during a later wetting and redrying process.

This improved process may be carried out in various ways. Preferably the drive of the rollers which support the film to be dried will be so designed that such movements of the rollers which permit shrinkage are allowed, while the film or web itself is kept under tension.

The principal object of the invention is the provision of a cellulosic film which, when in the finished state, is substantially unaffected by subjection to wetting but which retains substantially its original finished size and state.

This invention will be fully described with reference to the accompanying drawings in which:—

Fig. 1 is a diagram showing the shrinkage or contraction of cellulose films wetted after they have been finished.

Figs. 2 and 3 show two diagrams which demonstrate the conduct of a strip cut from the central portion and the edge of a cellulose skin respectively on wetting and drying it alternately, viz. its transverse and longitudinal shrinkages or contractions and expansions or dilatations.

In the drawings like characters of reference refer to the same parts.

Figure 4:
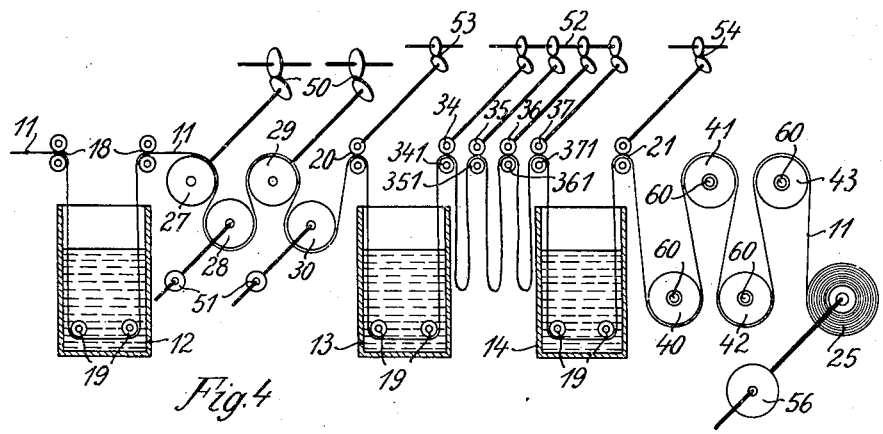
Fig. 4 is a diagrammatic view of an apparatus for manufacturing cellulose films according to my invention.

My researches and investigations have shown the surprising result that the shrinkage capacity of skins dried in a continuous drying process under tension, strongly decreases from the edge towards the middle, and that those parts of the central strip the shrinkage capacity of which lies below 12 to 10 per cent behave in a faultless manner during the subsequent wetting in wet baths. So to make use of this surprising result according to this invention the manufacture is so arranged that, after the drying process being carried out continuously and under tension, the marginal portions of the strip are cut away so as to leave a central zone, the transverse shrinkage of which is below 10 per cent.

This will be explained with reference to Fig. 1 of the drawings. In this figure as abscissa there is shown a finished band from which films are to be cut, the band being indicated as having a width of 100 units, for instance, 100 cm. In the curve are plotted the transverse shrinkage capacities of strips of 5 cm width cut, for instance, from the band of 100 cm width, which are wetted only once and then dried while not subjected to tension. The strips from the marginal part of the band then show great shrinkages on to 35 per cent. But this shrinkage rapidly decreases towards the middle of the band. The curve clearly shows that the central portion of the band or tape which in the present example shows low shrinkages, i.e. up to 10 per cent, extends to about 74 per cent of the width of the curve or the width of the full uncut band or tape corresponding to the abscissa of the curve so that these medial parts of the band may be used for films which later on are to be subjected to another wet treatment whether under tension or not, the shrinkage capacity being reduced to less than 10% if the marginal part whose elongation capacity surpasses this value is removed. The central zone so obtained amounts to at least 70 per cent of the total width of the strip. Thus for films subsequently to be subjected to a wet treatment, merely the central portion of the band or tape will be employed while the edge portions will be used for other purposes.

The conditions described refer to shrinkages in the width direction relatively to the direction of manufacture, while the longitudinal shrinkages are smaller and are substantially uniform across the entire width.

My researches have further shown that if a film or the like either of the edge portion or of the central portion, is alternately subjected to a plurality of wetting and drying operations, the values of the elongation taking place during the wetting and of the shrinkage taking place during the drying first vary strongly, but tend to attain constant minimum values after repeated alternations.

So according to the further embodiment of the invention, use is made of those conditions which approach the minimum shrinkage values where the films are to be wetted subsequently and thus a uniform behavior is obtained. This aspect of the invention will now be explained with reference to Figs. 2 and 3.

While in Fig. 1 the conditions have been shown when the samples of the band are wetted only once and then dried, Figs. 2 and 3 of the drawings show the condition if the samples are alternately wetted and dried several times. For samples there are used pieces or tapes of film of 20 by 20 cm area. In the abscissa there are shown the alternating wetting and drying in length with the zero point suppressed.

In Fig. 2 of the drawings the curve drawn in full lines shows the behavior of the length of the tape measured in the direction of manufacture, while the curve drawn in broken lines shows the behavior in the direction of the width. This test piece was cut out of the central portion of a tape or web 100 cm wide, while Fig. 3 shows similar curves for a test piece cut off near the edge of the tape.

If for instance, a tape of 200 by 200 mm is cut out of the central portion of a film which itself in its full width corresponds to the full length of abscissa (Fig. 1) and this tape is wetted, its width taken across to the direction of manufacture, increases to about 213 mm. When dried it shrinks to 179 mm (see broken line, Fig. 2), the shrinkage from the first dry state to the next being from 200−179=10.5 per cent.

When wetted again, it expands to 206 mm.

When dried, it shrinks to 175 mm, shrinkage 179−175=2.2 per cent.

When wetted, it expands to 203 mm.

When dried, it shrinks to 173 mm, shrinkage 175−173=1.14 per cent.

When wetted, it expands to 202 mm.

When dried, it shrinks to 172.5 mm, shrinkage 175−172.5=0.29 per cent.

It will be easily seen, therefore, that the capacity from one shrinkage in the dry state to the next wet state, from one period—wetting, drying or inversely, to the next rapidly decreases, so that the tape will not show any alteration of its dimensions as soon as this alternating process of wetting and drying has been repeated a few times. These tests are made without tension, so that the tape can easily follow all expanding or contracting tensions.

The curves show that inclusive of the wetting and drying which the skin undergoes during the working process, a total of three wetting and drying processes brings the tape or band into that state of preparatory treatment which renders it substantially indifferent to subsequent wetting. The method according to my invention is conducted in such a manner that the tapes and films which after being manufactured are to be subjected to a wet treatment, for instance, if films for photographic purposes are to be sensitized and treated in their sensitized state, they are wetted and dried at least three times, two drying processes at least taking place under tension and one intermediate drying process at least without the application of tension.

By the combination of dryings without the application of tension with following dryings under tension, very considerable advantages result as regards the manufacture. While a film wetted and dried without tension does not tend to distort or undergo undue elongations or reductions when later on it is subjected to another wetting, such a film will become wavy or corrugated, unless the moisture is very slowly and gradually withdrawn from it by proceeding very cautiously, which procedure is naturally impracticable in actual manufacture. If, however, the wetting and drying while the tape is not under tension, according to my invention, is followed by a wetting and drying under tension, all irregularities resulting from the treatment in the tension free or slack state are eliminated by this operation, so that the subsequent treatment without tension may quickly be carried through and be developed into a continuous process.

This treatment without tension may be carried through by a separate continuous process or this process may be inserted together with the subsequent treatment under tension as a continuous working state or phase into the main continuous manufacturing process of the film.

Figures 2 and 3 show clearly that the portions of the tape located towards the edge are subjected to stronger changes than the central portions of the tape. The strips to be subjected to the wet treatment later on will thus be preferably cut out of the central portion of the film.

In Fig. 4 of the drawings, an apparatus or plant is illustrated in which the film is manufactured. The film 11 passes a bath 12 which may be any last bath of known manufacturing processes, for instance, those producing a continuous film by regenerating viscose.

In the example shown in Fig. 4 the film is in the described stage of the manufacturing process alternately wetted and dried, the first wetting phase being within the bath 12. The film is kept under tension while leaving this bath and passing the drying rollers 27, 28, 29, 30. From this drying phase the film passes within a bath 13 for wetting the film, the bath consisting of water or any other liquid adapted to impart desirable properties to the product. Thus the bath may contain glycerine or other appropriate medium giving flexibility or suppleness to the product. The bath may also contain coloring medium for giving some color to the film.

From the bath 13 the film passes to the rollers 341, 351, 361 against which rollers the film is held by the rollers 34, 35, 36, 37. These rollers constitute the second drying section wherein the film is not subjected to tension but is suspended loosely upon the bottom rollers 341, 351, 361, 371. From these rollers the film passes within the bath 14, which may be of water or of any other appropriate liquid, such as described with reference to the bath 13, and which may give certain properties to the product as previously described.

The baths 13, 14 may be similar or may differ from each other, except that in both baths the film is wetted.

From the bath 14 the film passes to the third set of drying rollers 40, 41, 42, 43 in which the film is passed just as in the roller stage 27, 28, 29, 30 in wave-like lines or along a sinuous path.

The rollers may, in any desired manner, be driven by gears customary in the art, such as are diagrammatically indicated at 50, 51, 53, 54, 52. For guiding the film into and out of the baths and within the baths, guide rollers, such as 18, 19, 21 of usual construction, are provided which may be positively driven as is the case with the rollers 20, 21 or may be loosely mounted and rotatable on their axes like the rollers 19.

The drying rollers 27, 28, 29 are positively driven as indicated at 50 and 51, while the rollers 40, 41, 42 are loosely mounted on their axes or bearings, as indicated at 60. From the last drying stage the film 11 passes to the winding roller or beam 25 driven by 56.

In the apparatus illustrated in Fig. 4 of the drawings the last drying section 40, 41, 42, 43 is so designed that the film is free to shrink longitudinally as well as transversely. The transverse shrinkage is rendered possible by the rollers, for instance 40, 42, and 41, 43 respectively, being located at comparatively large distances apart so that along its unsupported section between the rollers the film is able to shrink in its width. To permit longitudinal shrinkage or contraction, the rollers are so arranged as to be displaceable relatively to the skin to be dried. The drive will thus not be made rigid but so that it permits relative motion allowing longitudinal shrinkage. To this end, in the construction illustrated in Fig. 4, the rollers are mounted loosely rotatable upon their shafts or axles 60, as indicated by double circles, so that relative movements of the rollers are rendered possible and thus the film is able to follow the tension causing the longitudinal shrinkage.

In this construction of the plant, the tension of the film is brought about by the winding roller 25 being positively driven, as indicated at 56.

Figure 5:
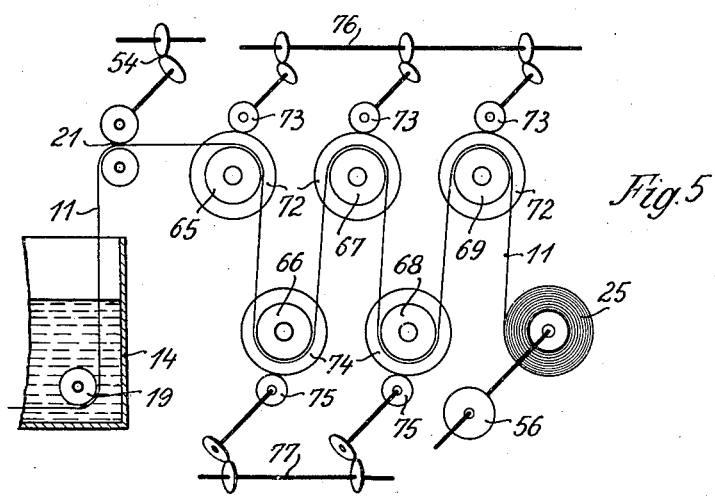
Figs. 5 and 6 are sectional views of modified end-sections of the apparatus shown in Fig. 1.
Figure 6:
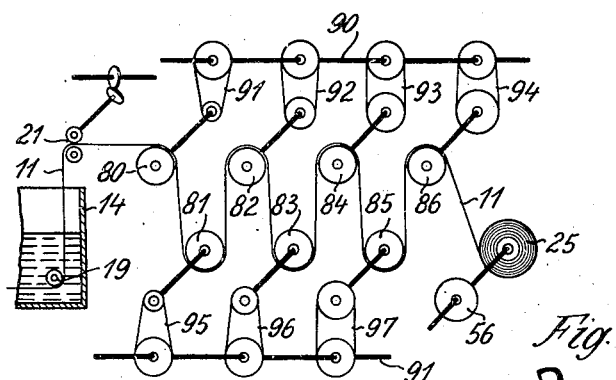

In Figs. 5 and 6 there are illustrated further examples of the roller drive for the last stage of the apparatus shown in Fig. 1, these modifications permitting too, longitudinal shrinkage. In Fig. 2 the rollers 65, 66, 67, 68, 69 which guide the web in wave or sinuous lines, are provided with an elastic or resilient drive. In this example the drive takes place by means of a friction gear 72, 73 and 74, 75 respectively of the usual customary construction, the friction members 73 and 75 respectively of which are driven from any suitable drive 76 and 77 respectively. Instead of the friction gear, any other resilient or elastic drive might be employed, such as a belt drive permitting slipping of the belt.

Fig. 6 of the drawings illustrates a further example of a drive for the last drying section, the drive taking into account the increasing longitudinal shrinkage by driving the rollers slower in proportion to the increasing drying and shrinkage respectively. The drying rollers are indicated by the reference characters 80, 81, 82, 83, 84, 85 and 86. The drive of the rollers takes place from the driving shafts 90, 91 by means of belt drives 92, 93, 94 and 95, 96, 97 respectively. The decreasing reduction of the belt drives being obtained by choosing the diameters of the pulleys mounted upon the shafts 90, 91 of equal diameters while the pulleys of the rollers 80 to 86 have diameters increasing in proportion to the increasing drying or shrinkage. It will, however, be readily understood that other ratio gears may be provided for the rollers adapted to bring about the desired reduction in the speed.

For the drying, the usual means may be employed; the drying sections may be arranged in chambers or rooms adapted to be heated by air or gases or the heating medium may be introduced into cavities or the hollow interior of the rollers. The arrangement shown in Fig. 4 is particularly suitable for effecting the drying in chambers, while in the modifications illustrated in Figs. 5 and 6 the heating medium is adapted to be introduced into the hollow rollers through tubular shaft ends, in a manner well known in the art and therefore not illustrated in the drawings.

I claim as my invention:—

1. In combination in apparatus for manufacturing strips, films and the like from cellulose skins, which after they are finished are to be subjected to a wet treatment, three sets of rollers for drying said strips, three baths for said strips, driving means for said drying rollers, one of said baths being disposed before each of said sets of rollers, means for passing said skins across the said drying rollers of the first and third set under tension and means for passing said skins across the rollers of the intermediate set without substantial tension, the rollers of the third set being disposed to pass the said skins in wave lines through the said set and being spaced sufficiently far apart, to permit transverse shrinkage of the said strips.

2. In combination in apparatus for manufacturing strips, films and the like from cellulose skins, which after they are finished are to be subjected to a wet treatment, three sets of rollers for drying said strips, three baths for said strips, driving means for said drying rollers, one of said baths being disposed before each of said sets of rollers, means for passing said skins across the said drying rollers of the first and third set under tension and means for passing said skins across the rollers of the intermediate set without substantial tension, the rollers of the third set being disposed to pass the said skins in wave lines through the said set and being spaced sufficiently far apart, to permit the transverse shrinkage of the said strips, and means mounting said drying rollers of the third set for displacement relatively to said strips, to permit longitudinal shrinkage of the said strips.

3. In combination in apparatus for manufacturing strips, films and the like from cellulose skins, which after they are finished are to be subjected to a wet treatment, three sets of rollers for drying said strips, three baths for said strips, driving means for said drying rollers, one of said baths being arranged before each of said sets of rollers, means for passing said skins across the said drying rollers of the first and third set under tension and means for passing said skins across the rollers of the intermediate set without tension, the rollers of the third set being arranged to pass the said skins in wave lines through the said set and being spaced sufficiently far apart, to permit transverse shrinkage of said strips, and means for journaling the said drying rollers of the third set loosely and easily rotatable, to thereby permit longitudinal shrinkage of the said strips.

4. In combination in apparatus for manufacturing strips, films and the like from cellulose skins, which after they are finished are to be subjected to a wet treatment, three sets of rollers for drying said strips, three baths for said strips, driving means for said drying rollers, one of said baths being arranged before each of said sets of rollers, means for passing said skins across the said drying rollers of the first and third set under tension and means for passing said skins across the rollers of the intermediate set without substantial tension, the rollers of the third set being arranged to pass the said skins in wave lines through the said set and being spaced sufficiently far apart, to permit transverse shrinkage of the said strips, the said driving means for the drying rollers of the third set being resilient to permit displacements of the said drying rollers relatively to the said strips and thus transverse shrinkage of the said strips.

5. In combination in apparatus for manufacturing strips, films and the like from cellulose skins, which after they are finished are to be subjected to a wet treatment, three sets of rollers for drying said strips, three baths for said strips, driving means for said drying rollers, one of said baths being disposed before each of the said sets of rollers, means for passing said skins across the said drying rollers of the first and third set under tension and means for passing said skins across the rollers of the intermediate set without substantial tension, the rollers of the third set being adapted to pass the said skins in wave lines through the said set and being spaced far apart, to permit transverse shrinkage of the said strips, the said driving means for the drying rollers of the third set being provided with means for reducing the speed of the drying rollers guiding the said strips as the dryness of the strips increases.

6. In the method of producing cellulosic films having a low shrinkage characteristic, the steps which comprise subjecting the film to a plurality of successive wetting and drying operations, at least two drying operations being carried out with the film under tension and at least one drying operation intermediate said tension dryings being carried out with the film not under tension.

7. In the method of producing cellulosic films, having a low and substantially uniform shrinkage characteristic, the steps which comprise successively, wetting the film, drying the film under tension, rewetting the film, drying the film while under substantially no tension, rewetting the film and drying the film under substantial tension, the latter tension being of such a nature that the drying of the strip effects longitudinal and transverse shrinkage thereof.

8. In the method of producing cellulosic films having a relatively low wet-distortion coefficient, the steps which comprise, forming a film of cellulosic material, maintaining said film under tension while drying the same, removing the marginal portions of said film, and subjecting the remaining central portion of said strip to a plurality of wetting and drying operations of which at least two drying operations are carried out with the film under tension and at least one drying operation, intermediate the said tension drying operations, is carried out with the strip under substantially no tension.

9. In the method of producing cellulosic film, having a relatively low wet-distortion coefficient, the steps which comprise, forming a film of cellulosic material, maintaining said film under tension while drying the same, removing the central portion of said film, and subjecting the remaining marginal portions to successive wettings and dryings, at least two of the dryings being effected while the film is subjected to a substantial tension and at least one drying being carried out intermediate said tension dryings and with the film under substantially no tension.

In testimony whereof I affix my signature.

ERNST BLEIBLER.